United States Patent
Sugimoto (10) Patent No.: US 7,722,074 B2
(45) Date of Patent: May 25, 2010

(54) AIRBAG APPARATUS

(75) Inventor: Shinichi Sugimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 3 days.

(21) Appl. No.: 12/162,754

(22) PCT Filed: Oct. 16, 2006

(86) PCT No.: PCT/JP2006/320590

§ 371 (c)(1),
(2), (4) Date: Jul. 30, 2008

(87) PCT Pub. No.: WO2007/088658

PCT Pub. Date: Aug. 9, 2007

(65) Prior Publication Data

US 2009/0096194 A1    Apr. 16, 2009

(30) Foreign Application Priority Data

Feb. 2, 2006    (JP) .............................. 2006-025409

(51) Int. Cl.
  *B60R 21/16*    (2006.01)
(52) U.S. Cl. ................. 280/728.2; 280/730.1
(58) Field of Classification Search .............. 280/730.1, 280/728.2
  See application file for complete search history.

(56) References Cited

U.S. PATENT DOCUMENTS 5,782,529 A    7/1998    Miller, III et al.

FOREIGN PATENT DOCUMENTS

| DE | 196 15 096 A1 | 9/1996 |
| DE | 196 14 314 A1 | 10/1996 |
| JP | 07-329676 A | 12/1995 |
| JP | 09-323607 A | 12/1997 |
| JP | 2000-016217 A | 1/2000 |
| JP | 2000-168485 A | 6/2000 |
| JP | 2002-037011 A | 2/2002 |
| JP | 2002-145003 A | 5/2002 |
| JP | 2004-276906 A | 10/2004 |

OTHER PUBLICATIONS

English translation of the International Preliminary Report on Patentability (Chapter I of the Patent Cooperation Treaty) from the International Bureau for International Application No. PCT/JP2006/320590 dated Aug. 14, 2008, 5 pages.

*Primary Examiner*—Eric Culbreth
(74) *Attorney, Agent, or Firm*—Fitch, Even, Tabin & Flannery (57) ABSTRACT

An effective technology is provided to intend an improvement of a deploying capability of an airbag apparatus. In one form, a retainer for housing an airbag of an airbag apparatus upon being folded back is constructed with a retainer body whose upper surface and an entire front surface other than left and right supporting portions at a lower portion are open, and a plastic plate serving as a plate having low rigidity closing an opening portion of the retainer body, and the plastic plate is fixed to an inside of the supporting portions of the retainer body, and a front portion of the retainer is formed to be a bending portion capable of being bent forward around a lower portion thereof as a fulcrum by the plastic plate.

5 Claims, 7 Drawing Sheets

AIRBAG APPARATUS

CROSS-REFERENCE TO RELATED APPLICATIONS

This application is a U.S. national phase application filed under 35 U.S.C. §371 of International Application PCT/JP2006/320590, filed on Oct. 16, 2006, designating the United States, which claims priority from JP 2006-025409, filed Feb. 2, 2006, which are hereby incorporated herein by reference in their entirety.

TECHNICAL FIELD

The present invention relates to an airbag apparatus that is equipped on a vehicle such as an automobile.

BACKGROUND ART

Hitherto, for example, various airbag apparatuses for restraining a body of an occupant in collision of an automobile or the like, such as an airbag apparatus for use in a driver's seat, which is expanded and deployed from a rotation center of a steering wheel in a driver's seat to a driver side, an airbag for use in a passenger seat, which is expanded and deployed from an instrument panel to a passenger seat side, or the like are used.

Recently, in a case that a large scale accident, in which a large external force is applied to the automobile, such as an overturn of a vehicle body due to a collision or the like, falling of a heavy load such as a fallen tree, or the like occurs, there is a possibility in which an impact is applied to a head from above a head of the occupant by an impact occurred at that time, therefore an airbag apparatus corresponding to such a case is already proposed (for example, refer to Japanese Unexamined Patent Application Publication No. 2002-37011).

In the aforementioned hitherto known technology, a basic configuration, in which an airbag constructed of a bag-shaped body where a base cloth is combined is housed in a backrest portion (or a headrest) of a seat of a vehicle, and a pressurized fluid from an inflator is supplied to the airbag in an emergency and expands the airbag, and which the airbag is deployed above the head of the occupant, is disclosed.

In order to intend an optimization for the airbag apparatus, a further smooth deploying capability of the airbag is required.

SUMMARY OF THE INVENTION

Hence, a problem of the present invention is to provide an effective technology for intending an improvement of a deploying capability of the airbag apparatus.

In order to solve the above-described problems, a first invention of the present invention is characterized in including an airbag for restraining a head of an occupant seated in a seat by deploying, a retainer including a bending portion at a front side and housing the airbag upon being folded back the same, and an inflator for supplying a pressurized fluid to the airbag.

According to a first invention of the present invention, when the gas is supplied from the inflator and the airbag is expanded, since the bending portion is strongly pushed forward by means of the airbag, and the bending portion is bent forward around a lower portion thereof as a fulcrum, the airbag can be slid out at low resistance from an inside of the retainer along an extending movement of the airbag caused by means of an expansion, and can be smoothly deployed from the retainer.

A second invention of the present invention is characterized in that in the first invention, the retainer is constructed with a retainer body whose upper surface and an entire front surface other than supporting portions at a lower portion are open, and a plate having low rigidity closing an opening portion of the retainer body, and the bending portion is formed by attaching the plate having low rigidity to the supporting portion of the retainer body.

According to the second invention of the present invention, the bending portion is formed of the plate having low rigidity, and when the plate is strongly pushed forward by means of the expansion of the airbag, the plate having low rigidity is bent forward around the lower portion as the fulcrum and thereby, similarly, the airbag can be slid out at low resistance from the inside of the retainer, and can be smoothly deployed from the retainer.

A third invention of the present invention is characterized in that in the second invention, a side wall portion and the supporting portion of the retainer body are installed in this order using an R-chamfered portion.

According to the third invention of the present invention, since the side wall portion and the supporting portion of the retainer body are installed in this order using an R-chamfered portion, the airbag can be prevented from being damaged during a deploying movement at the consecutively installed portion.

A fourth invention of the present invention is characterized in that in the second or third invention, a plastic plate is used to serve as the plate having low rigidity.

According to the fourth invention of the present invention, since the plastic plate is used to serve as the plate having low rigidity, which forms the bending portion, the weight of the bending portion can be reduced.

A fifth invention of the present invention is characterized in that in the first invention, an incision is formed in a lengthwise direction at each of left and right positions on a front wall of the retainer while being spaced apart with a clearance from a bottom wall, and the bending portion is formed by a rectangular plate being partitioned by means of the incisions at both sides.

According to the fifth invention of the present invention, when the rectangular plate is strongly pushed forward by means of the expansion of the airbag, the rectangular plate is bent forward around the lower portion as the fulcrum and thereby the airbag can be similarly slid out at low resistance from the inside of the retainer, and can be smoothly deployed from the retainer.

A sixth invention of the present invention is characterized in that in any one of the first through fifth invention, a notched portion is provided in the bending portion.

According to the sixth invention of the present invention, since the notched portion is provided in the bending portion, the weight of the bending portion can further be reduced, and further the flexibility in a bending direction is increased by lowering the rigidity in a width direction of the bending portion, and a further smooth deployment of the airbag can be realized.

According to the present invention, the improvement of the deploying capability of the airbag apparatus can be intended.

BRIEF DESCRIPTION OF DRAWINGS

FIG. 1 is a schematic side elevation an automobile seat provided with an embodiment of an airbag apparatus of the present invention, while FIG. 1(a) illustrates a non-operating time of the airbag apparatus, and FIG. 1(b) illustrates an operating time of the airbag apparatus.

FIG. 5 is a perspective view illustrating a retainer of the airbag apparatus of FIG. 1, while FIG. 5(a) illustrates a normally placed state, and FIG. 5(b) illustrates a reversed state.

FIG. 6 is a schematic cross-sectional view illustrating an operation of the airbag apparatus of FIG. 1, while FIG. 6(a) illustrates a non-operating time and FIG. 6(b) illustrates an operating time.

DETAILED DESCRIPTION OF THE PREFERRED EMBODIMENTS

Hereinbelow, an embodiment of the present invention will be explained with reference to the drawings.

Figure 1:
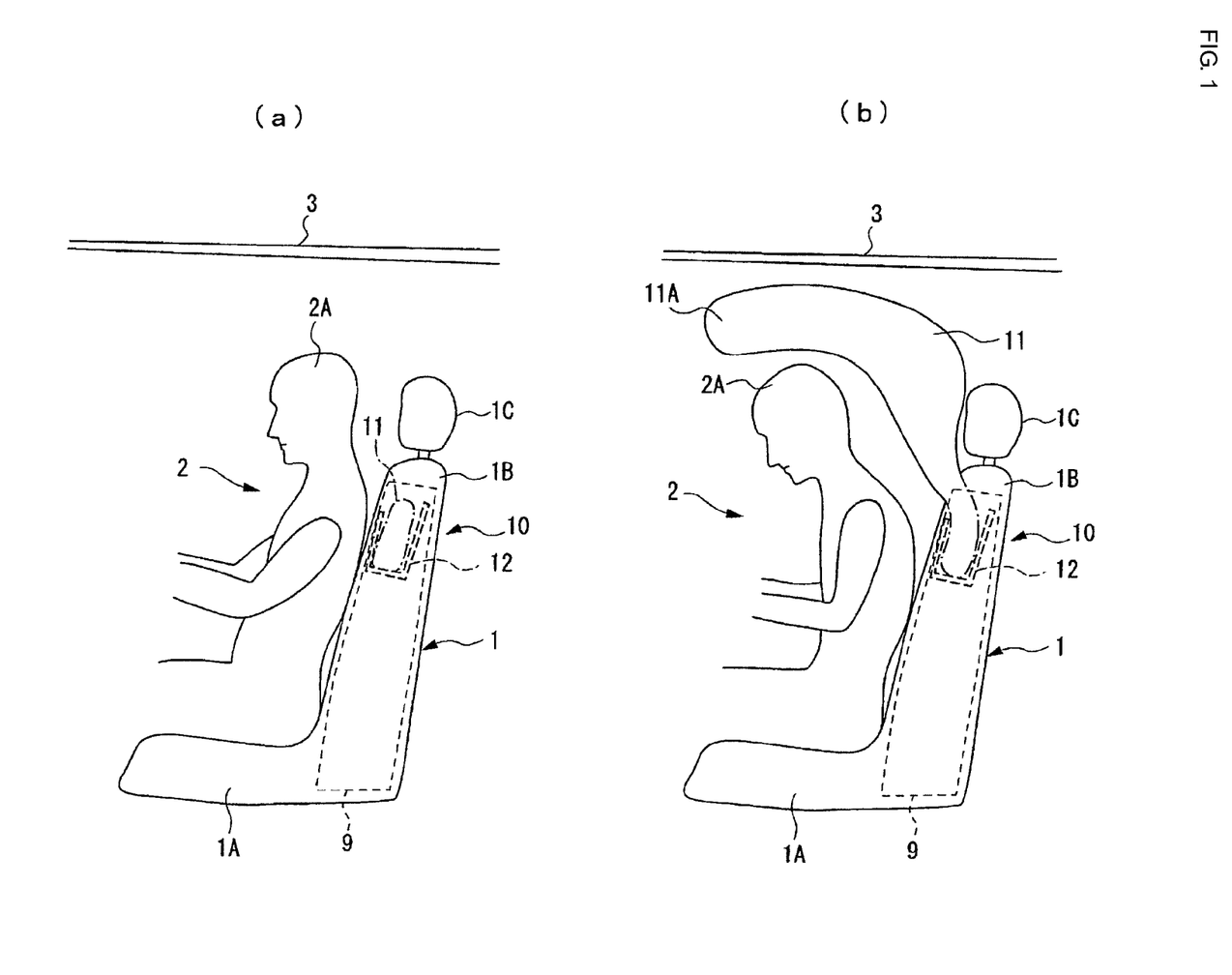

FIG. 1 is a schematic side elevation of an automobile seat 1 provided with the embodiment of the airbag apparatus of the present invention, FIG. 1(a) illustrates a state that the airbag apparatus is in a non-operating time, and FIG. 1(b) illustrates a state that the airbag apparatus is in an operating time. The aforementioned seat 1 is provided with a seat portion 1A where an occupant 2 is seated and a backrest portion 1B protruding upward from the seat portion 1A, which supports a back of the seated occupant 2. On a top portion of the backrest portion 1B. a head rest 1C is attached.

Figure 2:
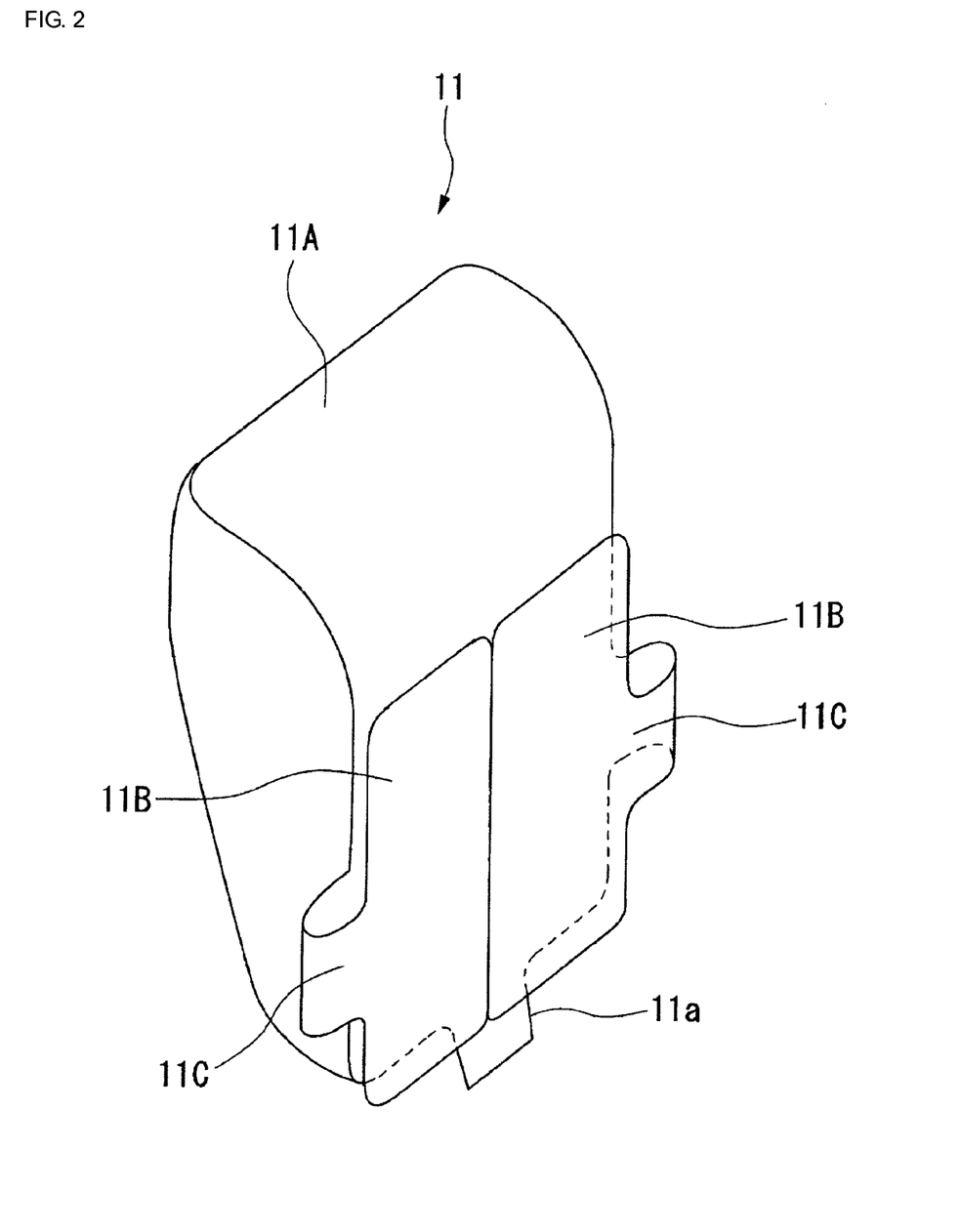
FIG. 2 is a perspective view illustrating the middle of expanding an airbag provided in the airbag apparatus of FIG. 1.

In the back rest portion 1B of the seat 1, an airbag apparatus 10 for restraining a head 2A of the occupant 2 in an overturn of a vehicle due to an accident or the like is equipped. The airbag apparatus 10 is provided with an airbag 11 as illustrated in FIG. 2. This airbag 11 is composed of a main bag 11A, and two of sub-bags 11B being consecutively installed with the main bag 11A in a communicating state at both of left and right sides thereof. FIG. 2 illustrates a state of the airbag 11 in the middle of a deploying movement, and a gas from an inflator 15 (refer to FIG. 3) flows up to the middle of a main chamber 11A, and thereafter, the gas flows into the sub-bag 11B upon passing through a communication portion 11C from the main bag 11A. The airbag 11 is formed by means of preparing two sheets of base cloths having a shape corresponding to the main bag 11A and two sub-bags 11B at both of the left and right sides thereof, overlapping the same at front and back sides thereof, and stitching peripheries thereof to form a bag shape, while.

Figure 3:
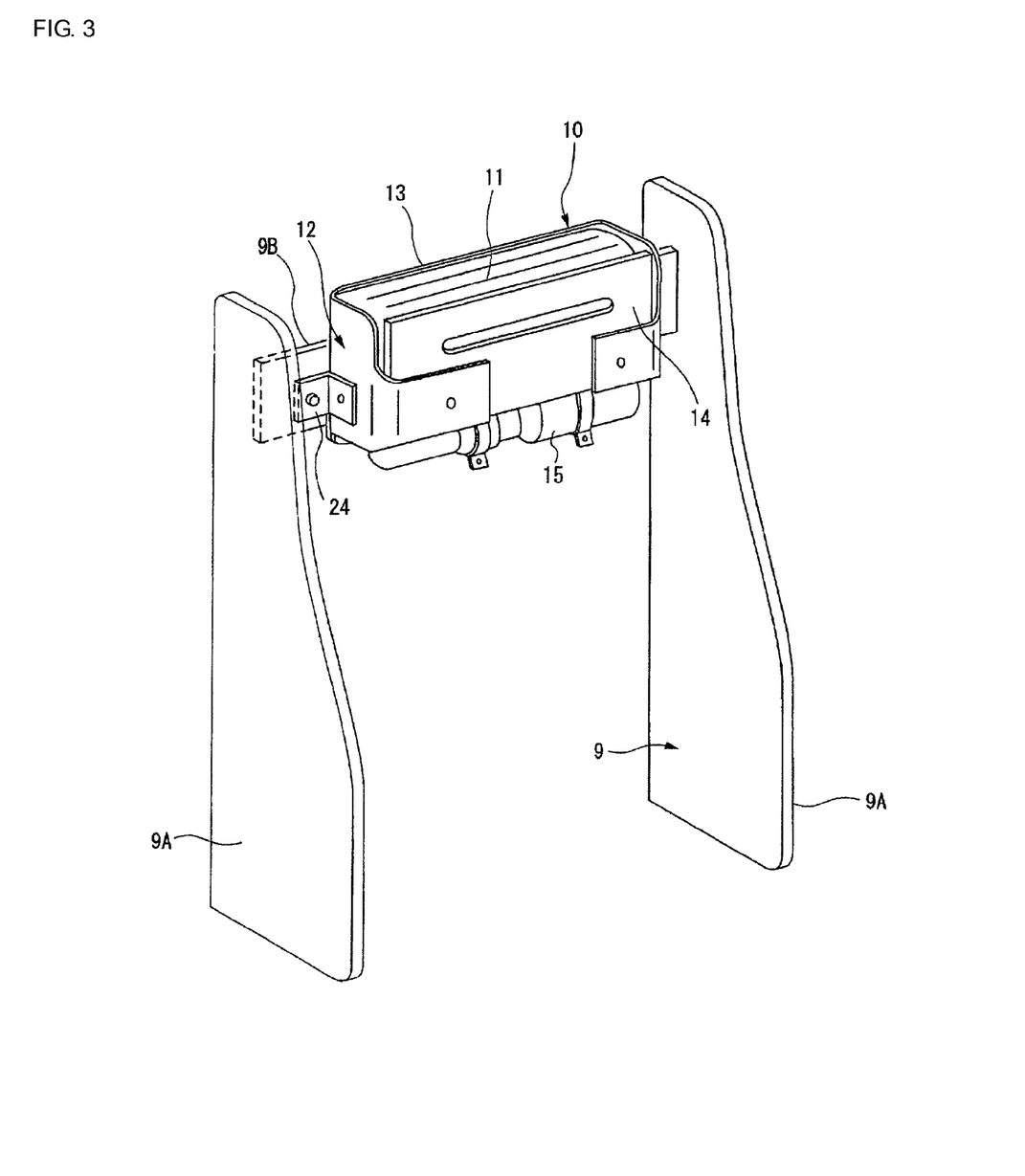
FIG. 3 is a perspective view illustrating a state where a seat frame is attached to the airbag apparatus of FIG. 1.

The airbag apparatus 10 is composed of the aforementioned airbag 11, a retainer 12 in which the airbag 11 is housed in a folded-back state, and the inflator 15 for supplying a gas (pressurized fluid) into the airbag 11, which is attached to the retainer 12, as illustrated in FIG. 3. A not-illustrated control circuit is connected to the inflator 15, and when a collision or an overturn of the vehicle occurs, the control circuit starts an initiator that is attached to the inflator 15 on the basis of a detection signal from a not-illustrated sensor that detects the collision or the overturn, and ignites the inflator 15.

The airbag apparatus 10 is in a state that the airbag 11 is folded back and housed in the retainer 12 in a normal time of non-operating state, as illustrated in FIG. 1(a). Further, for example, in a case that the automobile is overturned, or the like, the inflator 15 is ignited by means of the control circuit, and as illustrated in FIG. 1(b), the airbag 11 is expanded and extended forward from the retainer 12. The main bag 11A of the airbag 11 is deployed between a roof 3 of the automobile and the head 2A of the occupant 2 (Incidentally, the airbag 11 is deployed above the head 2A in a vehicle of convertible type or the like), and restrains an upward movement of the head 2A of the occupant 2. Furthermore, although not illustrated in FIG. 1(b), the sub-bags 11B of the airbag 11 are extended forward from respective base portions at both of the left and right sides of the main bag 11A at the same time, and push away and bend the head 2A of the occupant 2 forward. This reduces a burden toward a neck portion.

The airbag apparatus 10 is provided at an upper position in the backrest portion 1B by means of being attached to an upper part of a seat frame 9, which is a skeletal member of the seat 1. The seat frame 9 is provided with a pair of side plates 9A at both of the left and right sides in a vehicle width direction, and a cross member 9B that connects each of upper portions of these side plates 9A at a position situated nearer a rear side in the backrest portion 1B of the seat 1, and is provided with a not-illustrated base plate that is protruding forward from a lower portion of both side plates 9A in the seat portion 1A.

The airbag apparatus 10 is assembled by means of fixing the airbag 11 while being folded back and housing the same in the retainer 12, and attaching the inflator 15 to the retainer 12. The airbag apparatus 10 is attached to the upper part of the seat frame 9 by means of fixing the retainer 12 to the cross member 9B of the seat frame 9 with bolts.

Figure 5:
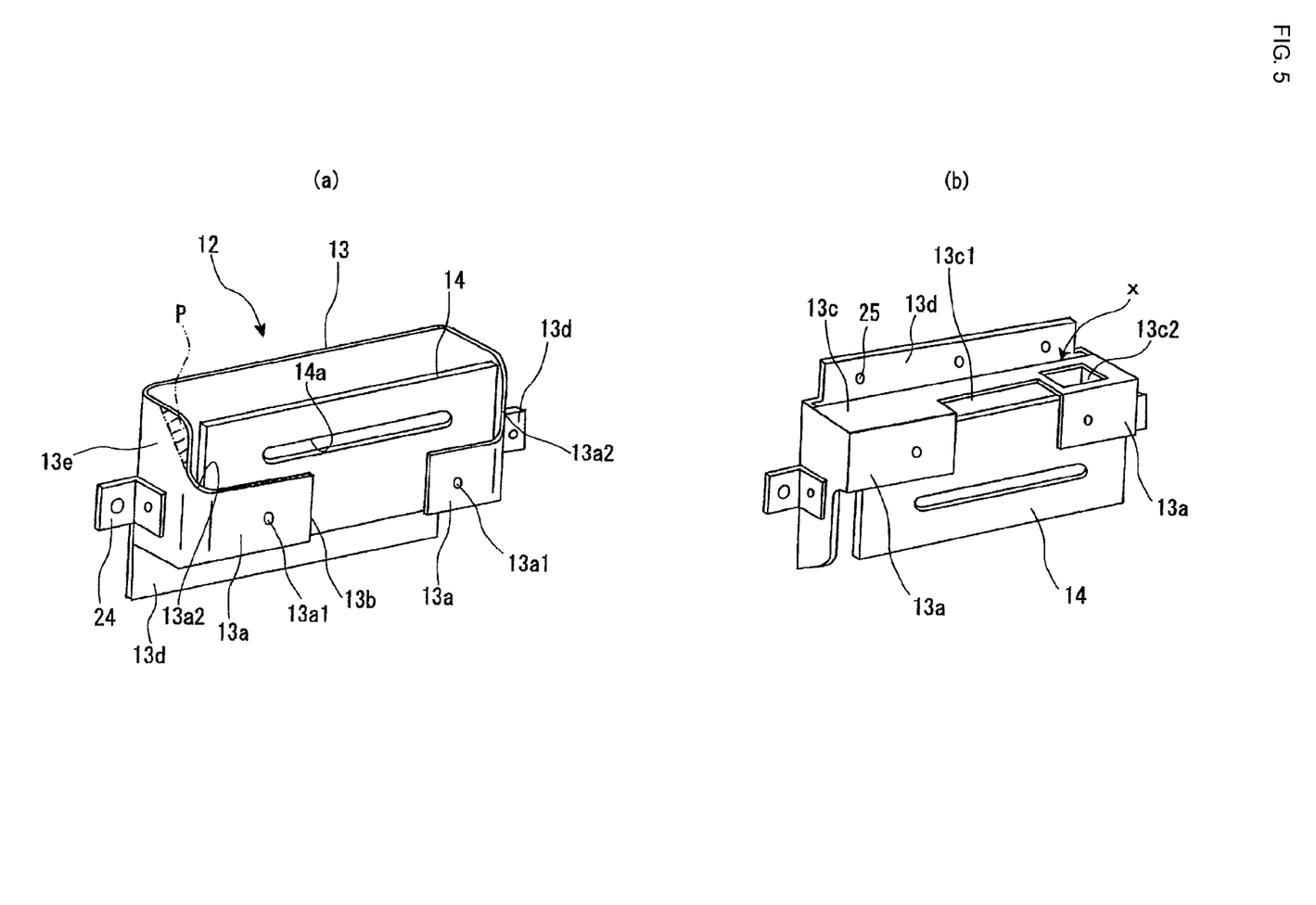

According to a present embodiment, the retainer 12 is composed of a box-shaped retainer body 13 whose upper surface and an entire front surface other than left and right supporting portions 13a in a width direction at a lower portion are open, as illustrated in FIG. 5(a) where a normally placed state thereof is shown, and a rectangular plastic plate 14 whose lower portion is fixed to an inside of the left and right supporting portions 13a with rivets 13a1 or the like (alternatively, a fastening operation using normal volts or screws is applicable), which obstructs an opening portion 13b at a front surface of the retainer body 13. A bending portion that is flexible around a lower portion thereof as a fulcrum toward a front side at a front portion of the retainer 12 is formed by the plastic plate 14. A notched portion 14a, for example, in an elongated hole shape in a width direction is provided in the plastic plate 14, in order to reduce the weight of the plastic plate 14 and to increase the flexibility in a bending direction while reducing rigidity in a width direction. The notched portion of the plastic plate 14 can be provided in various configurations and thereby the rigidity of the plastic plate 14 can be controlled. Moreover, it is preferable for a side wall 13e of the retainer body 13 to have a shape (a shape in which the portion P indicated by an imaginary line in FIG. 5 is deleted) that is cut in a slanting downward direction from an upper end of a front side to a front wall such that the resistance for the deploying movement of the airbag 11 is further reduced. Further, although the side wall 13e and the supporting portion 13a can be consecutively installed in a right angle, it is preferable for the same to be installed in this order using an R-chamfered portion 13a2 as illustrated in the drawing so as to avoid damage to the airbag 11 during a deploying movement thereof due to an angular portion.

In a bottom wall of the retainer body 13, as a reversed state, in which tops and bottoms and left and right are reversed, is illustrated in FIG. 5(b), an attaching portion 13d for attaching the airbag 11 is provided by extending a rear wall of the retainer body 13 downward, while providing an opening portion 13c1 between the left and right supporting portions 13a by means of cutting open a center portion that is consecutive to the opening portion 13b of the front wall, and further providing an opening portion 13c2 at a left side portion of a receiving portion 13c, and causing a clearance space (opening portion) x to intervene between a rear end portion side of the receiving portion 13c and the rear wall of the retainer body 13.

Figure 4:
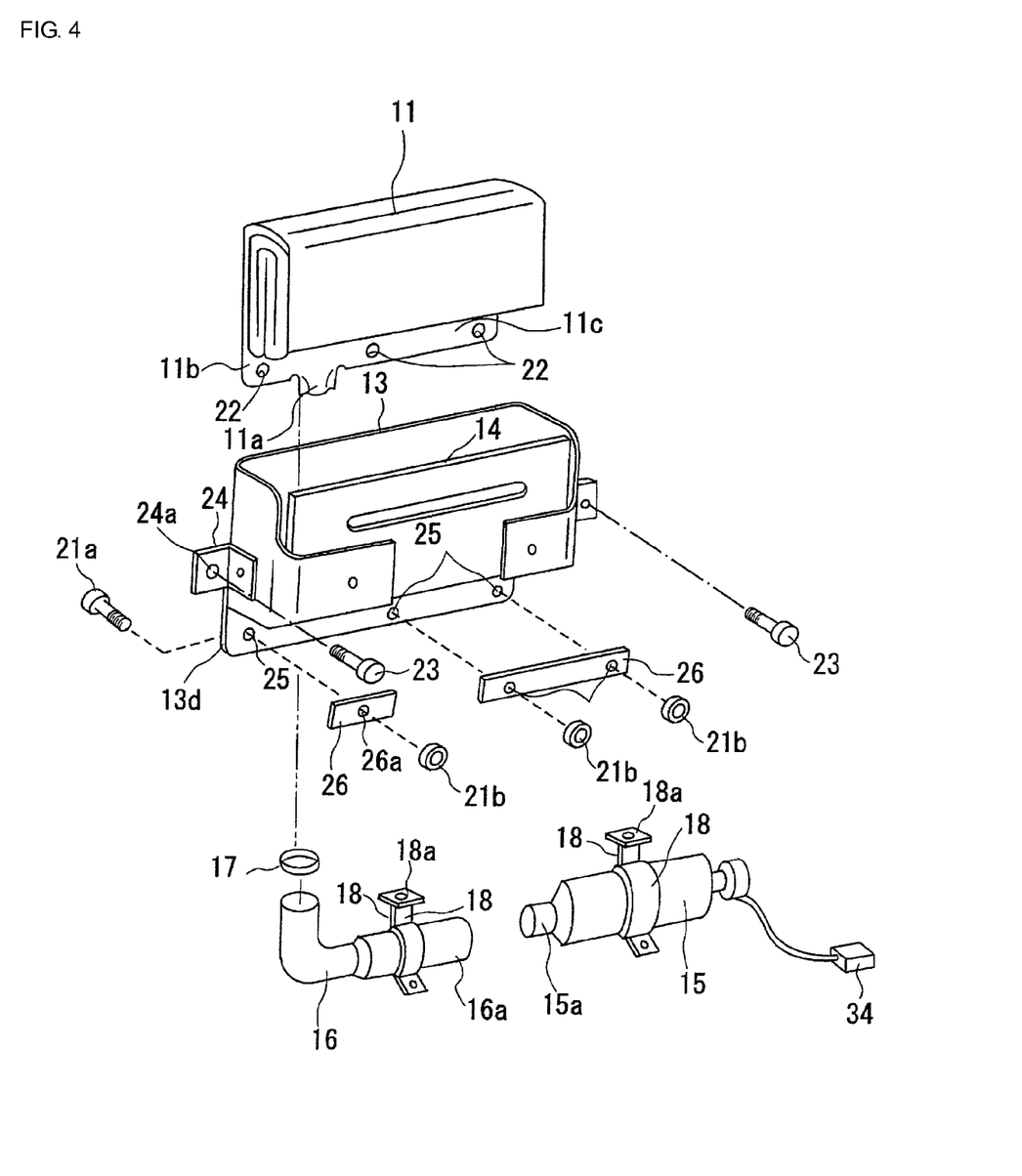
FIG. 4 is an exploded perspective view illustrating an assembling method and an attaching method of the airbag apparatus of FIG. 1.

At a base end side that is positioned at a lower side of the airbag 11, as illustrated in FIG. 4, a gas-supplying inlet 11a for supplying the gas to the airbag 11 is provided in a manner displaced leftward, and an attaching piece lib of a small piece is provided at a left side of the gas-supplying inlet 11a and a horizontally long attaching piece 11c is provided at a right side thereof, respectively.

When the airbag apparatus 10 is assembled, firstly, the airbag 11 is folded back and housed in the retainer 12, and a lower portion of the airbag 11 is supported with the receiving portion 13c of the bottom wall of the retainer body 13. Further, the gas-supplying inlet 11a, the attaching piece 11b, and the attaching piece 11c of the airbag 11 are respectively drooped downward after passing through the clearance space x between the aforementioned attaching portion 13d and the receiving portion 13c.

Furthermore, the attaching piece 11b at a left side of the airbag 11 is sandwiched between a pressing piece 26 and the attaching portion 13d of the retainer body 13, and is fixed to the attaching portion 13d after inserting a bolt 21a through a bolt hole 25 provided in the attaching portion 13d and a bolt hole 26a provided in the pressing piece 26, and screwing a nut 21b on the bolt 21a. Similarly, the attaching piece 11c of the airbag 11 is sandwiched between another pressing piece 26 that is longer than the aforementioned pressing piece 26 and the attaching portion 13d of the retainer body 13, and is fixed to the attaching portion 13d after respectively inserting the bolts 21a through two of the bolt holes 25 of the attaching piece 13d and two of the bolt holes 26a of the pressing piece 26, and screwing the nuts 21b, on the bolt 21a respectively. Thereby, the housing operation for the airbag 11 into the retainer 12 is completed.

On the other hand, the gas-supplying inlet 11a of the airbag 11 is connected to the inflator 15, which is horizontally attached to a bottom surface of the retainer body 13, via a connecting pipe 16 that is made of metal. An end of the connecting pipe 16 is connected to a connecting end 15a of the inflator 15 via a connecting attachment 16a fitted thereupon by means of pressure bonding or welding. The other end of the connecting pipe 16 being bent upward is connected to the gas-supplying inlet 11a while fitting the gas-supplying inlet 11a of the airbag 11 thereupon and fitting a clamp band 17 or the like, which is made of metal, thereupon and by swaging the same. The inflator 15 and the connecting pipe 16 that is connected thereto are horizontally attached to the bottom surface of the retainer body 13 by means of that two clamp members 18, each having a semi-circular arc shape are respectively fitted thereupon, and then respective both end portions of the clamp members 18 are riveted (alternatively, a fastening operation using normal bolts or screws may be applicable), and that the clamp members 18 at the inflator 15 side are attached to the receiving portion 13c at the right side of the bottom wall of the retainer body 13, and the clamp members 18 at the connecting pipe 16 side are attached to the receiving portion 13c at the left side of the retainer body 13, by means of screwing respective attaching pieces 18a at an upper end, which is provided at one of the clamp members 18 of respective places. A connecting terminal 34 that is pulled out from a rear end of the inflator 15 is connected to the above-described not-illustrated control circuit.

Thus, the airbag apparatus 10 is assembled and the assembled airbag apparatus 10 is attached to an upper portion of the seat frame 9 by means of fixing an attaching piece 24 formed of L-shaped attachment, which is fixed to each of left and right side walls of the retainer body 13 with a riveting operation or the like to a cross member 9B of the seat frame 9 with a bolt 23 that is inserted into a bolt hole 24a.

Figure 6:
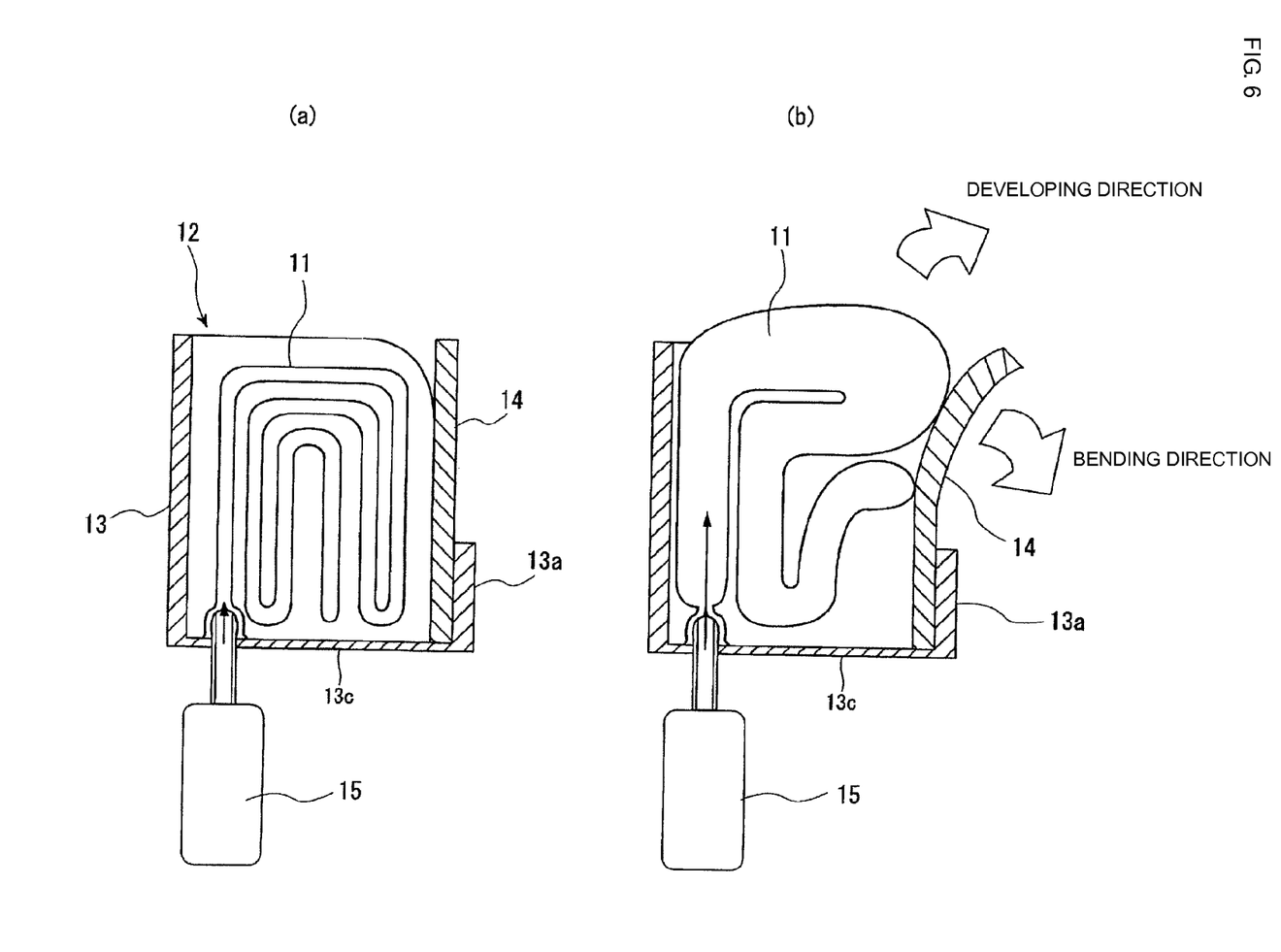

Well, the airbag 11 that is folded back and housed in the retainer 12 is, as illustrated in FIG. 6(a), positioned in the retainer 12 (FIG. 6(a)) while contacting a lower portion thereof with the left and right receiving portions 13c of the retainer body 12, and contacting a front portion thereof with the plastic plate 14. In addition, when the gas is supplied from the inflator 15, and the airbag 11 is expanded, the plastic plate 14 is strongly pushed forward by means of the airbag 11, and the plastic plate 14 is bent forward around the lower portion as a fulcrum. Hence, the airbag 11 can be slid out at low resistance from the inside of the retainer 12 along an extending movement caused by means of the expansion thereof, and can be smoothly deployed from the retainer 12 (FIG. 6(b)).

Currently, since the notched portion 14a is provided in the width direction in the plastic 14, the weight of the plastic plate 14 can further be reduced, and the rigidity in the width direction of the plastic plate 14 is lowered and the flexibility in the bending direction can be increased and the airbag can further smoothly be expanded. Moreover, since the side walls and the supporting portion of the retainer body are installed in this order using the R-chamfered portions, the airbag can be prevented from being damaged during the deploying movement by the consecutively installed portion.

Figure 7:
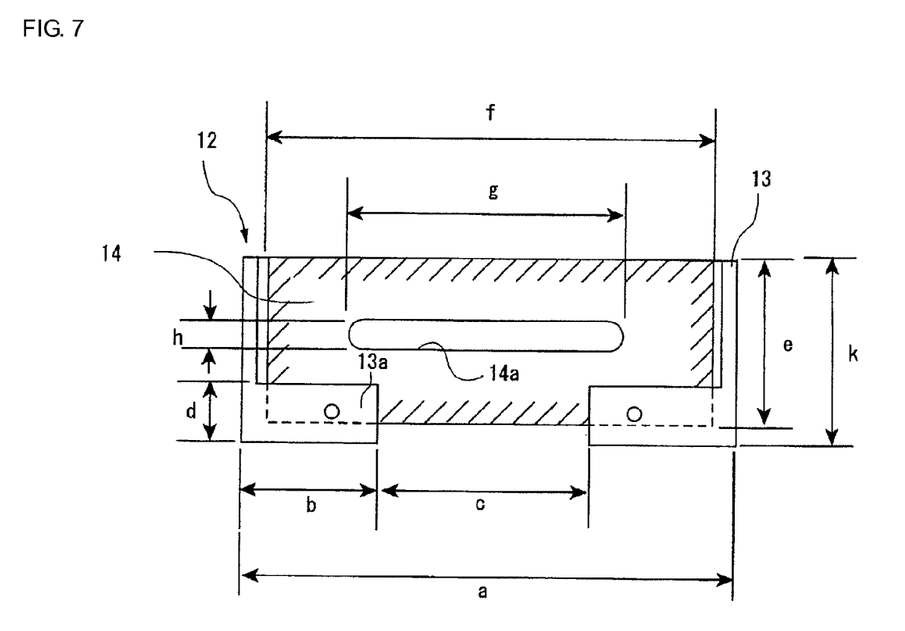
FIG. 7 is a front elevation illustrating a dimension of each part of the retainer constituting the airbag apparatus of FIG. 1.

In order to strongly hold the lower portion of the aforementioned plastic plate 14 with the supporting portion 13a, and to ensure the smooth deploying movement of the airbag 11 from the retainer 12 upon preferably bending the plastic plate 14 around the lower portion of the plastic plate 14 as the fulcrum in a deploying direction, it is sufficient to respectively set various dimensions shown in FIG. 7, namely a width "f" and a height "e" of the plastic plate 14 relative to a width "a" and a height "k" of the retainer body 13, a width "b", a height "d" of the supporting portion 13a, a distance "c" between the supporting portions 13a relative to the plastic plate 14, and a length "g" and a width "h" of the notched portion 14a relative to the plastic plate 14 to appropriate values on the basis of a balance between a necessary bending amount and strength (in other words, to decide the shape). Currently, the notched portion 14a is not limited to the one having a horizontally long shape as illustrated in the drawing, but the ones having horizontally long hole shape may be provided in two of upper and lower steps, and in this occasion, the lengths may be differed at each step. Further, in replacement of one long hole having the horizontally long shape in each step, a plurality of small long holes (or round holes) may be horizontally laid out.

Incidentally, in the above-described explanation, although the plastic plate 14 is used to serve as a bending portion for reducing the weight, the bending portion may be provided using a metal sheet having low rigidity and thin thickness.

Figure 8:
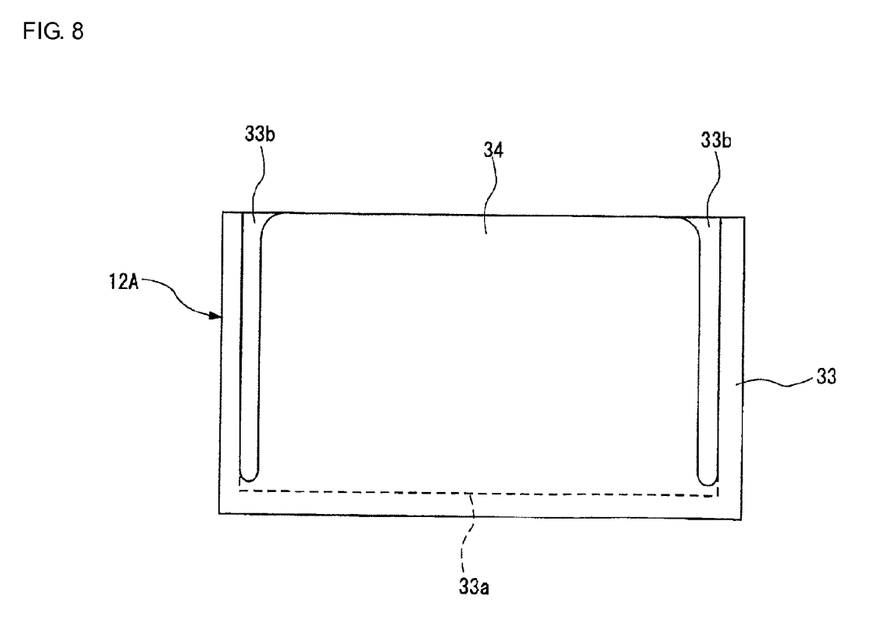
FIG. 8 is a front elevation illustrating a retainer in another embodiment of the airbag apparatus of the present invention.

FIG. 8 is a front elevation illustrating another embodiment of the present invention.

In the present embodiment, in a retainer 12A of the airbag apparatus, narrow incisions 33b are formed in a lengthwise direction at a front wall of a retainer body 33 having an opening at an upper surface thereof, at positions being in contact with left and right side walls, respectively, while being spaced apart with a clearance from a bottom wall 33*a*. Thereby, a rectangular plate 34 being partitioned by means of the incisions 33*b* at both sides at a front surface of the retainer body 33 is formed, and thus, a bending portion at a front portion of the retainer 12A is formed.

In the present embodiment, the gas is also supplied from the inflator 15 and the airbag 11 is expanded, and when the rectangular plate 34 is strongly pushed forward by means of the airbag 11, the rectangular plate 34 is bent forward around the lower portion as a fulcrum, and the airbag 11 can be slid out at low resistance form an inside of the retainer 12A along the extending movement of the airbag 11 caused by means of the expansion thereof, and the airbag 11 can smoothly be deployed from the retainer 12A.

The invention claimed is:

1. An airbag apparatus comprising:
   an airbag for being deployed to restrain a head of an occupant seated in a seat;
   a retainer having a top, bottom, front, and rear, and including a bending portion at the front, the retainer having a body configured to house the airbag in a folded configuration thereof with the retainer body being open at the top of the retainer and having lower supporting portions at the front of the retainer so that the body is open at the front of the retainer above the supporting portions;
   the retainer bending portion comprising a plate that is of lower rigidity than the retainer body and being attached to the supporting portions thereof to extend upwardly therefrom to substantially close the front of the retainer; and
   an inflator for supplying a pressurized fluid to the airbag during airbag deployment.

2. The airbag apparatus according to claim 1, wherein the retainer body has a side wall portion that is connected to one of the supporting portions of the retainer body and which include a chamfered portion therebetween.

3. The airbag apparatus according to claim 1, wherein the retainer plate is a plastic plate.

4. An airbag apparatus comprising:
   an airbag for being deployed to restrain a head of an occupant seated in a seat;
   a retainer having a top, bottom, front and rear, and including a bending portion at the front; and
   an inflator for supplying a pressurized fluid to the airbag during airbag deployment, wherein the retainer has a bottom wall at the bottom thereof and the retainer bending portion includes a front wall having a pair of elongate incisions extending on either side of the front wall while being spaced apart with a clearance from a bottom wall so that the retainer bending portion is formed by a rectangular plate being partitioned by means of the incisions at both sides.

5. The airbag apparatus according to claim 1, wherein a notched portion is provided in the retainer plate.

* * * * *